United States Patent [19]

Tsuji

[11] Patent Number: 4,786,150

[45] Date of Patent: Nov. 22, 1988

[54] ZOOM LENS WITH BEAM SPLITTER

[75] Inventor: Sadahiko Tsuji, Kanagawa, Japan

[73] Assignee: Canon Kabushiki Kaisha, Tokyo, Japan

[21] Appl. No.: 909,125

[22] Filed: Sep. 18, 1986

[30] Foreign Application Priority Data

Sep. 19, 1985 [JP] Japan .............................. 60-207028
Sep. 19, 1985 [JP] Japan .............................. 60-207029
Sep. 21, 1985 [JP] Japan .............................. 60-209439

[51] Int. Cl.⁴ .................. G02B 23/04; G02B 13/06
[52] U.S. Cl. ......................................................... 350/427
[58] Field of Search ............................... 350/427, 428

[56] References Cited

U.S. PATENT DOCUMENTS 3,989,349  11/1976  Besenmatter et al. ............... 350/423
4,249,793   2/1981  Uehara ................................. 350/423

FOREIGN PATENT DOCUMENTS 0034510  2/1982  Japan ................................... 350/423

Primary Examiner—John K. Corbin
Assistant Examiner—Rebecca D. Gass
Attorney, Agent, or Firm—Robin, Blecker & Daley

[57] ABSTRACT

A zoom lens including a plurality of movable lens units for zooming, a diaphragm and a beam splitter for splitting off part of the light beam toward an optical device, characterized in that this beam splitter is arranged in between the frontmost and rearmost movable zoom units.

10 Claims, 2 Drawing Sheets

ZOOM LENS WITH BEAM SPLITTER

Background of the Invention

1. Field of the Invention

This invention relates to zoom lenses, and more particularly to zoom lenses having a beam splitter built therein.

2. Description of the Related Art

The conventional zoom lens of this kind comprises, from front to rear, a focusing lens system, a plurality of lens units movable for zooming, the beam splitter, a diaphragm, and a fixed image forming lens unit. Even in the other kinds of zoom lenses than that described above, for example, that kind which has the focusing lens unit movable for zooming, it has been the prior art that the beam splitter is arranged behind the rearmost movable unit. Also, in some cases, a part of the relay unit is arranged between the rearmost movable unit and the beam splitter. Therefore, the image point formed with light emerging from the beam splitter can be maintained constant. As for the diaphragm, from the standpoint of utilizing the split-off part of the light beam with a constant high efficiency, it is preferred to put it behind the beam splitter. This arrangement, however, results in an unduly large increase of the diameter of the first lens unit, because the distance from the front vertex to the diaphragm is quite long.

FIG. 6 shows an example of the conventional beam splitter arrangement in the zoom lens, including from left (front) to right (rear) a focusing lens unit 11 which is held stationary during zooming, an axially movable lens unit 12 as the variator, another axially movable lens unit 13 as the compensator, the beam splitter 14, a diaphragm 15 and an image forming lens unit 16. 17 is a finder optical system. Because the beam splitter 14 is arranged to the rear of the compensator 13, the image point for the finder is maintained constant against zooming. Also, because the beam splitter 14 is arranged in front of the diaphragm 15, the light beam to be split is always of the maximum diameter determined by the diameter of the front lens unit. Though there are these advantages, the long distance from the focusing lens unit 11 to the diaphragm 15 gives rise to a problem of increasing the diameter of the focusing lens unit 11 to admit of an oblique ray of light shown by a dashed line. To improve this, it may be considered to bring the diaphragm 15 ahead of the beam splitter 14. In this case, however, the efficiency of utilization of the light is reduced because the stopped-down light beam by the diaphragm is to be split.

SUMMARY OF THE INVENTION

It is an object of the present invention to provide a zoom lens having a beam splitter device incorporated therein, while nevertheless permitting its longitudinal and lateral lengths to be minimized.

In attaining this and other objects, the invention provides a zoom lens wherein the split-off light beam by the beam splitter device is directed to an optical device, despite that the zoom lens is zoomed, and the shift of an image plane in the optical device is suppressed to such a level as not to give a substantial problem in actual practice.

DETAILED DESCRIPTION OF THE PREFERRED EMBODIMENTS

Figure 1:
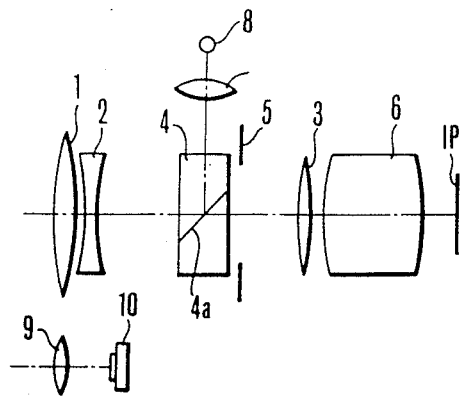
FIGS. 1 to 5 are longitudinal views of different embodiments of optical systems according to the present invention.

In FIG. 1, there is an embodiment of the invention, where 1 is a focusing lens unit which is held stationary during zooming, but moves axially for focusing purposes; 2 is a variable magnification lens unit axially movable mainly for varying the image magnification; 3 is a compensation lens unit movable simultaneously with and independently of the variable magnification lens unit 2 mainly for compensating for the image shift; 4 is a beam splitting prism provided with an inclined half reflection mirror 4a, having a function of splitting a light beam into two parts, and arranged between the variable magnification lens unit 2 and the compensation lens unit 3; 5 is a diaphragm for controlling the F-number arranged between the beam splitting prism 4 and the compensation lens unit 3; and 6 is an image forming lens unit for converging light flux emerged from the compensation lens unit 3. For note, what is here called "unit" refers to either one optical lens element, or a plurality of optical lens elements. IP denotes an image plane.

And, since, as has been described above, the beam splitting prism 4 and the diaphragm 5 are arranged in a space between the front optical part or front movable lens unit, or, in this instance, the variable magnification lens unit 2, and the rear optical part or rear rearmost movable lens unit, or in this instance, the compensation lens unit 3, it is made possible to shorten the distance between the front vertex and the diaphragm and, therefore, to reduce the diameter of the front lens unit.

Next, 7 is a light projection lens; 8 is a light source such as an infrared light emitting diode, for use in focus detection. These parts are arranged successively on a path of the split-off part of the light beam by the beam splitting prism 4. 9 is a collection lens for forming an image of an object on a photoelectric transducing differential sensor 10. The sensor 10 has two light receiving areas positioned adjacent to each other.

Figure 2:
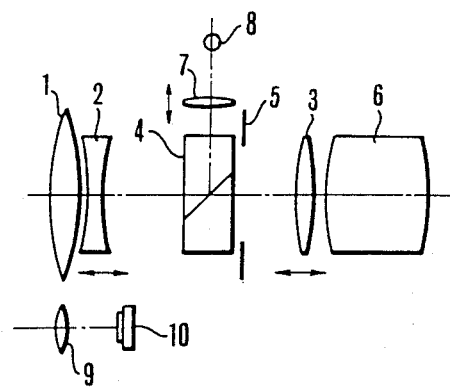

Here, though, as depicted in FIG. 2, impartment of simultaneous movement for image shift compensation to the projection lens 7 with zooming constitutes one method, it is to be understood that in application to the active type auto-focus using infrared light projected through the lens system, if the sensor for the infrared light positioned outside the lens system is, for example, of the 2-sectioned differential type so that when an image of the projected light spot on the object takes its place on its section boundary, the output becomes zero representing in-focus, any change of the conjugate relationship between the image of the projected light spot and the projection light source does not affect the detection of in-focus condition, as long as the symmetry of the shape of the spot image is not broken. For this reason, in the embodiment of FIG. 1, the projection lens 7 is fixed. On the other hand, if the lens system is designed so that the range of variation of the image magnification of the lens unit 2 contains −1 times, the image shift can be limited to a minimum. The explanation about this will be made later more fully.

Also, though, in the foregoing embodiment, the position of the diaphragm 5 is set behind the beam splitting prism 4, it is to be understood that if the beam splitting prism adapted to be used with the active type auto-focus is combined with a minute light source of excellent collimation such as laser diode as the projection light source, for the light beam for auto-focus can fully pass through the opening of the diaphragm at usual aperture values, it is also possible to arrange the diaphragm 5 in front of the beam splitting prism 4.

FIG. 2 shows another embodiment of the invention in which the projection lens 7 is made to move in synchronism with movement of the variable magnification lens unit 2 in order to improve the accuracy of focus detection when automatic focusing is performed. In this case, the image shift resulting from the movement of the variable magnification lens unit 2 is compensated for by moving the projection lens 7. Therefore, the image of the light source projected onto the object to be photographed becomes clear regardless of the zooming position, and, therefore, the sharpness of the image of the reflection of the light source on the sensor 10 also increases to improve the SN (signal-to-noise) ratio of the output signal.

Figure 3:
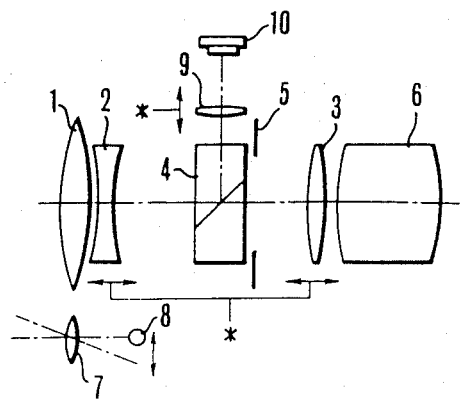

For note, the light source 8 and the differential sensor 10 may be exchanged in position as shown in FIG. 3.

Figure 4:
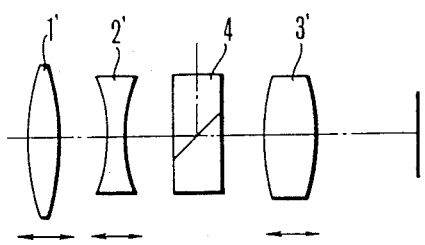

Also, though, in the embodiment of FIG. 1, the zoom lens has the frontmost lens unit held stationary during zooming, the two zoom units and the relay lens, what is called the 4-unit type zoom lens, the present invention is also applicable to another type of zoom lens whose first, second and third lens units 1', 2' and 3' move simultaneously and independently to effect zooming as shown in FIG. 4, in which the beam splitting prism 4 is positioned in between any adjacent two of the three zoom units.

Though, in the embodiment of FIG. 2, the lens unit arranged on the path of the split-off part of the light beam by the beam splitting prism is made to move with zooming to compensate for the change of the image sharpness, it is to be understood that by setting forth a particular condition for the optical design parameters of that part of the zoom lens which lies on the front side of the beam splitting prism, the range of change of the image sharpness can be lessened without having to move the lens unit on the split-off light path.

Figure 5:
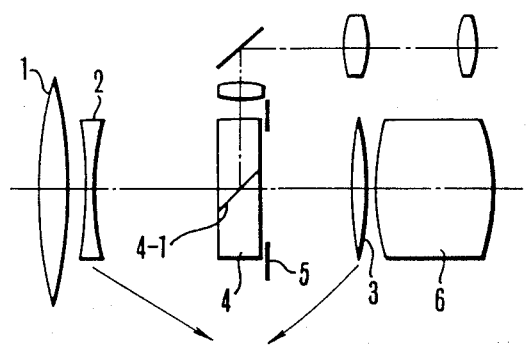
Figure 6:
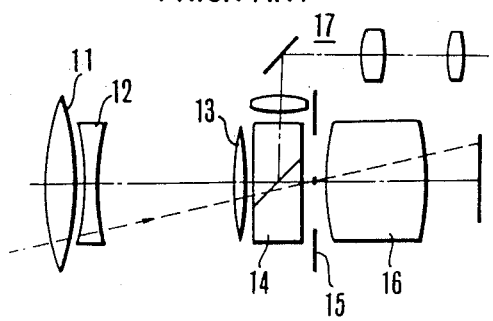
FIG. 6 is a longitudinal view illustrating the conventional example.

In another embodiment of FIG. 5, the lens unit 2 for variation of the magnification and the lens unit 3 for compensation with the diaphragm 5 fixed therebetween are moved in direction indicated by respective arrows to effect zooming from the wide angle to the telephoto end. And, the beam splitting prism 4 and the diaphragm 5 are arranged in between the lens units 2 and 3 at such a location as not to interfere with them over the entire zooming range. The split-off light from the prism 4 is directed either to the auto-focus system or to the finder. Because of the lack of an equivalent lens to the compensation lens unit 3, the image plane in the auto-focus system or finder is caused to shift as the image magnification of the zoom lens varies. This image shift increases as the zoom ratio increases. So, all the lens units for variation of the image magnification on the front side of the beam splitting prism 4, in this instance, the lens unit 2, are designed in such a way that the range of variation of their or its magnification with zooming includes a value of −1x with an advantage of minimizing the distance the image plane for the split-off light beam shifts with zooming.

This is based on the principle that in the neighbourhood of −1x, the longitudinal magnification takes a value of zero. In other words, in the concept of differential domain, no image shift takes place. Therefore, by specifying the design parameters of each lens unit, the shift of the image plane for the split-off beam with zooming is minimized.

Thereby, the total movement of the equivalent lens in the split-off light path to the compensation lens unit 3 with zooming is minimized, or that equivalent lens is omitted, permitting simplification of the structure of the lens system as a whole and minimization of the bulk and size of the entire lens system to be achieved.

In the embodiments of the invention, the diaphragm is arranged near the beam splitting prism 4, and the position of the diaphragm is brought as far ahead in the lens system as possible so that the height of incidence of the oblique ray toward the corner of the picture format on the focusing lens unit is lowered with an advantage of reducing the diameter of the focusing lens unit. This assists in achieving a minimization of the bulk and size of the entire lens system.

For note, as the compensation lens unit 3 moves in one direction throughout the zooming range, it can be made to contribute to a variation of the image magnification. Therefore, the duty of varying the image magnification which the variable magnification lens unit 2 should bear can be lessened, and the shift of the image plane due to the variation of the magnification of the lens unit 2 is made lesser.

Also the variable magnification lens unit may have two lenses or more in number, and two or more of the variable magnification lens units may be put on the front side of the beam splitting prism, provided that the overall magnification of the variable magnification lens units on the front side varies in a range containing −1x. Particularly when the beam splitting prism is arranged ahead of rearmost variable magnification lens unit, it is made possible to carry out variation of the image magnification with high efficiency and to minimize the shift of the image plane for the split-off light beam.

In the embodiments of the invention, in case when the total shift of the image plane with zooming is not large, the finder system or auto-focus system on the path of the split-off part of the light beam by the beam g prism may be constructed without the use of a particular lens for the compensation of the image shift therein.

What is claimed is:

1. A zoom lens having a front and a rear, comprising:
   a plurality of lens units each movable for zooming along an optical path, one of said lens units being located toward said zoom lens front and another of said lens units being located toward said zoom lens rear;
   light beam splitting means in a fixed location between said one and such other of said lens units for splitting said optical path to provide a further optical path split-off from said optical path; and
   an optical device arranged in said further optical path.

2. A zoom lens according to claim 1, wherein said optical device has a projection lens unit arranged to move in said further optical path in correspondence with movements of said movable lens units.

3. A zoom lens according to claim 1, wherein said optical device is a focus detecting device.

4. A zoom lens according to claim 1, wherein said optical device is a view finder.

5. A zoom lens according to claim 1, wherein that movable lens unit which lies ahead said beam splitting means has a magnification of −1 times in the middle of the zooming movement thereof.

6. A zoom lens according to claim 1, further comprising a lens unit arranged aside said beam splitting means to remain stationary during zooming.

7. A zoom lens according to claim 1, further comprising a diaphragm positioned behind said beam splitting means.

8. A zoom lens having a front and rear, comprising:
   beam spliting means for splitting an optical path to provide a further optical path split-off from said optical path;
   a front part on one side of said beam splitting means, said front optical part having at least one movable lens unit; and
   a rear optical part including another movable lens unit on the opposite side of the said beam splitting means and arranged to move simultaneously with said first-mentioned movable lens unit for zooming purposes,
   wherein said front optical part has a magnification of −1 times in the middle of zooming.

9. A zoom lens having a front and rear, comprising:
   a front movable lens unit and a rear movable lens unit which move along an optical path for zooming;
   beam splitting means for splitting the optical path to provide a further optical path split-off from said optical path, said beam splitting means being fixed in between said front movable lens unit and said rear movable lens unit; and
   a projection lens arranged in said further optical path to move correspondingly with movement of said front movable lens unit.

10. A zoom lens according to claim 8 or 9, further comprising a diaphragm positioned behind said beam splitting means.

* * * * *